United States Patent
Baayen

(10) Patent No.: US 11,568,104 B2
(45) Date of Patent: Jan. 31, 2023

(54) SYSTEM FOR THE GLOBAL SOLUTION OF AN EVENT-DEPENDENT MULTICRITERIA NON-CONVEX OPTIMIZATION PROBLEM

(71) Applicant: KISTERS AG, Aachen (DE)

(72) Inventor: Jorn Huibregt Baayen, Nuth (NL)

(73) Assignee: KISTERS AG, Aachen (DE)

( * ) Notice: Subject to any disclaimer, the term of this patent is extended or adjusted under 35 U.S.C. 154(b) by 264 days.

(21) Appl. No.: 17/248,457

(22) Filed: Jan. 26, 2021

(65) Prior Publication Data
US 2021/0232734 A1 Jul. 29, 2021

(30) Foreign Application Priority Data
Jan. 28, 2020 (EP) .................................. 20020045

(51) Int. Cl.
G06F 11/36 (2006.01)
G06F 30/20 (2020.01)
G06F 119/08 (2020.01)

(52) U.S. Cl.
CPC .......... *G06F 30/20* (2020.01); *G06F 11/3608* (2013.01); *G06F 2119/08* (2020.01)

(58) Field of Classification Search
CPC ..................................................... G06F 11/36
See application file for complete search history.

(56) References Cited

U.S. PATENT DOCUMENTS

| | | | |
|---|---|---|---|
| 8,965,548 B1 * | 2/2015 | Kamath | G06Q 10/06315 700/100 |
| 9,946,972 B2 | 4/2018 | Marecek | |
| 2008/0215512 A1 | 9/2008 | Narzisi et al. | |
| 2015/0193687 A1 * | 7/2015 | Park | G06N 5/04 706/46 |
| 2016/0117158 A1 * | 4/2016 | MacCleery | G06F 30/00 717/174 |
| 2018/0356772 A1 | 12/2018 | Cembrano et al. | |

FOREIGN PATENT DOCUMENTS

EP 3173880 A1 5/2017

OTHER PUBLICATIONS

Anilkumar Markana, Padhiyar Nitin, Moudgalya Kannan, Lexicographic optimization based MPC: Simulation and experimental study, Computers & Chemical Engineering, vol. 88, pp. 135-144, Feb. 24, 2016, Pergamon Press, Oxford, GB.
Carlos Ocampo-Martinez, Model Predictive Control of Wastewater Systems, London, GB, Springer, (Jan. 10, 2010), ISBN 978-1-4471-5718-2, XP002764393.
Choobineh Moein, Mohagheghi Salman, A multi-objective optimization framework for energy and asset management in an industrial Microgrid, Journal of Cleaner Production, vol. 139, pp. 1326-1338, Aug. 30, 2016, Elsevier, Amsterdam, NL.
Mike Huftle, Methoden der Optimierung bei mehrfacher Zielsetzung, http://www.optiv.de/Methoden/MehrZOpt/MehrZOpt.pdf, retrieved Jul. 9, 2020.

* cited by examiner

*Primary Examiner* — Jae U Jeon
(74) *Attorney, Agent, or Firm* — Smartpat PLC

(57) ABSTRACT

A system for solving an event-dependent multicriteria optimization problem of at least one cyber-physical system, comprising a control device for controlling the at least one cyber-physical system, the control device controlling the cyber-physical system in dependence on a list of prioritized objectives by solving at least one event-dependent suboptimization problem is characterized in that each objective from the list of prioritized objectives is captured as an objective function, each objective function consisting of at least two parts, a first part of which relates to directly capturing the objective and a second part of which describes a condition under which each result of one of the preceding objectives of each of the preceding suboptimization problems is substantially not negatively affected.

14 Claims, No Drawings

SYSTEM FOR THE GLOBAL SOLUTION OF AN EVENT-DEPENDENT MULTICRITERIA NON-CONVEX OPTIMIZATION PROBLEM

TECHNICAL FIELD

The present disclosure relates to a system for solving an event-dependent, multicriteria optimization problem of at least one cyber-physical system, comprising a control device for controlling the at least one cyber-physical system, the control device controlling the cyber-physical system in dependence on a list of prioritized objectives by solving at least one event-dependent suboptimization problem.

BACKGROUND

Such systems are generally known and are already being used in cyber-physical systems. The term "cyber-physical system" uses the word component "cyber" to refer to a control system consisting of a network of informatic software components with mechanical and electronic parts that communicate via a data infrastructure, and uses the word component "physical" to refer to the physical system that is controlled by the control system and can be, e.g., a river system or a road network. An example of an event influencing such a cyber-physical system is precipitation or snowmelt and the impact thereof on watersheds with river channels, canals, detention basins, reservoirs, flood zones, etc., but also wastewater from sewage treatment plants, industrial operations, and households. In this example, a cyber-physical system includes, for example, buildings for regulating water volumes and also the aforementioned water intake and channeling systems. Controlling the buildings, in turn, is performed in dependance on many variables, such as, among other things, water flow rate, width and depth of river flows, intake capacity of catch basins, etc., as well as water levels or pressures in piping systems. The predictive control of the corresponding buildings of the cyber-physical system results in an objective being met upstream and/or downstream. This objective is variable in time but describes a situation determined or to be determined at a certain point in time (e.g., different in summer than in winter), which is allowed to occur or should be maintained in dependance on the event so that the cyber-physical system can weather the event well.

Cyber-physical systems can also be affected by completely different events, e.g., in the field of energy supply, wherein an objective must then also be determined in order to optimally control at least one control device.

The present invention is to be described in more detail using the example of public water systems in order to make the operating principle easier to understand. However, the invention is explicitly not limited to this field of application.

The cyber-physical system in a watershed is intended to control the water quantity of the water systems within the cyber-physical system. Controlling is performed with the support of electronic data processing and with the support of computational programs installed on electronic data processing equipment. The occurrence of an event has a consequence for the cyber-physical system that occurs at different geographical locations of the cyber-physical system at different times. For example, precipitation occurs in a region and the amount of water distributes and moves downstream in the existing water systems. Thus, controlling in such cases should also be anticipatory to control buildings located far upstream and/or downstream long before the local occurrence of the event takes place. For example, intake capacities in catch basins can be increased by releasing water, or weirs can be opened to regulate water flow, etc.

In the case of optimization of one or more cyber-physical systems, there is usually a very different and occasionally also very complex structure of subproblems, which have to be solved by means of optimization in order to achieve the optimization. Thus, there is not only one objective towards which optimization can be performed, but in practice there are very many objectives that have to be considered when optimizing one or more cyber-physical systems. In the embodiment described herein with reference to optimizing a water balance, it is usually not exclusively an optimizing only with the objective of achieving a minimum or maximum of a water level at a certain location of the cyber-physical system that is relevant, but at the same time also an optimizing with the objective of, e.g., generating energy (water energy) or minimizing operating costs when using pumps and other energy consumers. Thus, in a cyber-physical system, there are usually cascading optimization problems which, in addition, differ from optimization systems in other cyber-physical systems. In order to be able to optimize such cyber-physical systems, a large number of variables are required, which strongly increase depending on the number of subproblems that must also be considered. Thus, in order to be able to perform an optimization in the prior art, measures have to be taken to limit the complexity of the computational program. This is usually done by simplifying the subproblems. However, such simplifications also lead to inaccurate results. The quality of the optimization suffers from such simplifications.

The computational programs currently in use either require a very large amount of computing power since considering the large number of variables requires extensive computational operations, or are inexpensive and fast and use heuristic models to solve the problem. However, heuristic models are not a basis for the best possible strategy for solving the problem.

Optimizing a control device or a plurality of control devices in such a cyber-physical system thus presents an enormous challenge to those skilled in the art. As already explained, such optimizations are carried out with the support of computers and computational programs that are set up on such computers and calculate optimization processes. However, the basis for the calculation is always the digital initial data or raw data developed from the measurement data of the event.

Due to the aforementioned circumstances, the computational processes in the prior art are very extensive and require high computer power and, to date, are not applicable to large problems that need to be solved in a short computational time, and in many complex applications, such as the above-described application of water regulation in cyber-physical systems, use mathematically simplified considerations or else use heuristic models, which do not allow optimization of a solution.

Currently, such computational processes are performed depending on prioritized objectives.

An example of this is known from U.S. Pat. No. 9,946,972 B2.

First, an objective with the highest priority, e.g., priority 1, is solved. Then, a new suboptimization problem with the objective of the next highest priority, priority 2, is processed under a constraint which requires that the objective result of priority 1 cannot be worse than that achieved in the suboptimization of priority 1. Then, a new suboptimization problem with the objective of the next highest priority 3 is processed which then has two constraints which require that the objective result of this new suboptimization cannot become worse than that of the previous two suboptimizations from priorities 1 and 2, and so on. In this manner, the prioritized objectives are optimized step by step in the order of their priority, up to a final priority.

An algorithm called lexicographic goal programming is known. This technique uses so-called epsilon constraints to create variables that have a non-zero value when an objective (e.g., level between min and max) is violated, and otherwise are zero.

SUMMARY

The object of the present disclosure is to refine the above-mentioned system in such a manner that data required for optimum control to obtain a global optimum can be processed with less extensive computing processes and without mathematical simplification in a much shorter time than before in order to be able to carry out rapid processing of event-dependent data in a relatively short time and to make it available to a control device.

The object is achieved in that each objective from the list of prioritized objectives is captured as an objective function, each objective function consisting of at least two parts, a first part of which relates to directly capturing the objective and a second part of which describes a condition under which each result of one of the preceding objectives of each of the preceding suboptimization problems is substantially not negatively affected.

Thereby, it is possible to prevent the number of variables of an optimization problem from increasing, as would be the case, for example, with a computational operation of the prior art. Providing a first and a second part in an objective function has the advantage that constraints are no longer needed to implement the multicriteria optimization. Such constraints hinder the search for a global optimum.

An advantage of splitting prioritized suboptimization problems into micro-problems is that at least some of the micro-problems can be processed in parallel.

The following detailed description is merely exemplary in nature and is not intended to limit the invention or the application and uses of the invention. Furthermore, there is no intention to be bound by any theory presented in the preceding background or the following detailed description.

DETAILED DESCRIPTION

A preferred embodiment of the present invention is described in more detail below. The description of the preferred embodiment usually serves only to explain the invention by means of an example. The present invention is not limited to this example. Rather, the present invention comprises all embodiments covered by the claims.

Within the scope of the present disclosure, a multicriteria optimization problem is meant to be a prioritized list of optimization objectives. Objective or optimization objective means either the maximization or minimization of a function or the best possible compliance with one or more inequalities, the inequalities being also based on a function. In the present invention, the term "continuation parameters" means the continuous change between a simplification of an original problem and the original problem. For example, the barrier parameters of the interior-points method as well as homotopy parameters that interpolate between simplified and complex physical models are continuation parameters.

A preferred embodiment is used in water systems and is therefore described in more detail below with respect thereto. However, it can also be used in other cyber-physical systems and is explicitly not limited to water systems and water management systems. In general, water management systems should be optimized with respect to several objectives: the operators want to keep the water level in a reservoir, e.g., between the desired minimum and maximum water levels, while at the same time maximizing energy generation from hydropower. These objectives may conflict with each other, as it may be advantageous from an energy generation perspective to first allow the water level to rise above the maximum level and then lower it below the minimum level.

At the same time, it is not always physically possible for such a water management system to maintain the water level between the desired minimum and maximum value. For example, in a phase of drought, it is not always possible to maintain the minimum level. The water level then drops below the minimum level. In a phase in which there is a lot of precipitation or a strong snowmelt, floods occur, and the maximum level cannot always be maintained. The min/max problem itself is therefore also an optimization problem.

In such scenarios, we are dealing with a prioritized cascade of optimization problems:
1. meeting environmental requirements (e.g., min/max values).
2. maximizing economic objectives (maximizing hydropower output, minimizing pump energy costs).

This list could be refined into a list of any number of prioritized objectives, the prioritization being changeable. For transportation systems, conflicts of objectives could be minimizing travel time for motorists and minimizing $CO_2$ emissions.

The system for solving an event-dependent multicriteria optimization problem of at least one cyber-physical system comprises a control device for controlling the at least one cyber-physical system. Such a control device may be a computer, a mobile terminal, or any device that comprises an electronic computing unit and either comprises or can access a common storage medium. The control device can operate in a wired and/or wireless manner. The control device controls the cyber-physical system in dependence on a list of prioritized objectives stored in the storage medium and solves at least one event-dependent suboptimization problem.

Each objective from the list of prioritized objectives is captured by the control device as an objective function, wherein in one embodiment at least one bipartite objective function may be dependent on at least one continuation parameter and/or at least one constraint for the optimization is dependent on at least one continuation parameter. These are constraints that are independent of the list of prioritized objectives.

Each objective from the list of prioritized objectives is to be captured as an objective function, each objective function consisting of at least two parts, a first part of which relates to directly capturing the objective and a second part of which describes a condition under which each result of one of the preceding objective functions of each of the preceding suboptimization problems is substantially not negatively affected.

In the preferred embodiment, the first part of each of the objective functions which relates to directly capturing the objective also relates to capturing an objective that can be described by an inequality condition. In other embodiments, this does not have to be the case. In the preferred embodiment, it can be beneficial that at least one of the inequality conditions is captured using a minimum or maximum function. In other embodiments, this does not have to be the case.

In an alternative to the preferred embodiment, the first part of each of the objective functions which relates to directly capturing the objective also relates to capturing an objective that can be described by minimizing or maximizing a function. In other embodiments, this does not have to be the case.

In the preferred embodiment, in the second part of each of the objective functions, the condition that each result of one of the preceding objectives of each of the preceding suboptimization problems is substantially not negatively affected is captured using a minimum or maximum function or, alternatively, using a smoothed minimum or maximum function. In other embodiments, this does not have to be the case.

The aforementioned use of a minimum or maximum function or of a smoothed minimum or maximum function is part of a preferred embodiment. However, alternatives thereto which may be used in other embodiments exist.

Thus, instead of the minimum and/or maximum function, at least one of the following mathematical expressions may be used:

Heaviside function

Dirac delta function any sigmoid function (there are several variants)

functions that depend on one or more "conditional statements"/conditional expressions or smoothed versions of these expressions or any expressions, smoothed or not, that in any way attempt to replicate "if/else" or "sigmoid" behavior or contain such behavior.

In the preferred embodiment, the control device computes with a computational program that solves the suboptimization problems associated with the priorities using a continuation method. For the computational process, each suboptimization problem is split into a plurality of micro-problems, the micro-problems having fixed continuation values. By splitting at least some of the suboptimization problems into micro-problems, some of the micro-problems can be processed in parallel. In other embodiments, this does not have to be the case.

For example, if a plurality of micro-problems in the preferred embodiment depends on a single suboptimization problem, these micro-problems can then be executed in parallel once the suboptimization problem has been processed.

Suitable for the present invention are algorithms that operate according to the above-mentioned three points, and in particular algorithms that parallelize computations of (in)dependent combinations across multiple (hyper)threads, CPU cores, CPUs or computers.

The present invention has been described as a system. In the same manner, it can also be used in a method. The system or method according to the invention can also be implemented in a computer, e.g., in a mobile terminal.

What is claimed is:

1. A system for solving an event-dependent multicriteria optimization problem of at least one cyber-physical system, comprising: a storage medium; and a control device for controlling the at least one cyber-physical system, the control device controlling the cyber-physical system in dependence on a list of prioritized objectives by solving at least one event-dependent suboptimization problem, wherein each objective from the list of prioritized objectives is captured as an objective function, each objective function comprising of at least two parts, including a first part of which relates to directly capturing the objective and a second part of which describes a condition under which each result of one of the preceding objectives of each of the preceding suboptimization problems is substantially not negatively affected.

2. The system according to claim 1, wherein the first part which relates to directly capturing the objective also relates to capturing an objective that can be described by an inequality condition.

3. The system according to claim 2, wherein at least one of the inequality conditions is captured using a minimum or maximum function.

4. The system according to claim 2, wherein at least one of the inequality conditions is captured using a smoothed minimum or maximum function.

5. The system according to claim 1, wherein the first part which relates to directly capturing the objective also relates to capturing an objective that can be described by minimizing or maximizing a function.

6. The system according to claim 1, wherein in the second part, the condition that each result of one of the preceding objectives of each of the preceding suboptimization problems is substantially not negatively affected is captured using a minimum or maximum function.

7. The system according to claim 1, wherein in the second part, the condition that each result of one of the preceding objectives of each of the preceding suboptimization problems is substantially not negatively affected is captured using a smoothed minimum or maximum function.

8. The system according to claim 1, wherein at least one of the objective functions is dependent on at least one continuation parameter.

9. The system according to claim 8, wherein a computational program which solves the suboptimization problems associated with the priorities using a continuation method.

10. The system according to claim 9, wherein each suboptimization problem is split into a plurality of micro-problems, the micro-problems having fixed continuation values.

11. The system according to claim 10, wherein at least some of the micro-problems are processed in parallel.

12. The system according to claim 1, wherein at least one constraint for the optimization is also dependent on at least one continuation parameter.

13. An electronic data processing device, on which a computer-readable computational program is installed, in which the system according to claim 1 is implemented.

14. A computer program product, comprising a non-transitory computer-readable storage medium on which a computer-readable computational program is stored in which the system according to claim 1 is implemented, wherein the computer-readable computational program, when executed on an electronic data processing device, causes the electronic data processing device to apply the system according to claim 1 in a computational process.

* * * * *